(12) United States Patent
Han et al.

(10) Patent No.: US 9,210,366 B2
(45) Date of Patent: Dec. 8, 2015

(54) METHOD AND APPARATUS FOR PROCESSING MULTIMEDIA

(75) Inventors: Sang-jun Han, Seoul (KR); Bo-mi Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1188 days.

(21) Appl. No.: 12/391,791

(22) Filed: Feb. 24, 2009

(65) Prior Publication Data

US 2009/0317060 A1 Dec. 24, 2009

(30) Foreign Application Priority Data

Jun. 24, 2008 (KR) ........................ 10-2008-0059791

(51) Int. Cl.
*H04N 5/85* (2006.01)
*H04N 5/765* (2006.01)
*G11B 27/034* (2006.01)
*G11B 27/10* (2006.01)
*H04N 9/82* (2006.01)

(52) U.S. Cl.
CPC .............. *H04N 5/765* (2013.01); *G11B 27/034* (2013.01); *G11B 27/105* (2013.01); *H04N 9/8205* (2013.01)

(58) Field of Classification Search
USPC ..................................... 386/248, 239; 725/14
See application file for complete search history.

(56) References Cited

U.S. PATENT DOCUMENTS

| | | | |
|---|---|---|---|
| 6,292,688 B1 * | 9/2001 | Patton ............................ | 600/544 |
| 7,096,431 B2 | 8/2006 | Tambata et al. | |
| 7,698,238 B2 * | 4/2010 | Barletta et al. .................. | 706/16 |
| 2002/0072952 A1 * | 6/2002 | Hamzy et al. .................... | 705/10 |
| 2003/0028383 A1 * | 2/2003 | Guerin et al. .................. | 704/275 |
| 2003/0236582 A1 * | 12/2003 | Zamir et al. .................... | 700/94 |
| 2005/0289582 A1 * | 12/2005 | Tavares et al. ................... | 725/10 |
| 2006/0222337 A1 * | 10/2006 | Fujikawa et al. ................ | 386/95 |
| 2006/0271405 A1 * | 11/2006 | Cipolle et al. .................... | 705/3 |
| 2007/0033050 A1 * | 2/2007 | Asano et al. .................. | 704/270 |
| 2007/0088833 A1 * | 4/2007 | Yang et al. .................... | 709/227 |

(Continued)

FOREIGN PATENT DOCUMENTS

| | | |
|---|---|---|
| JP | 2002-230011 A | 8/2002 |
| JP | 2003-76460 A | 3/2003 |

(Continued)

OTHER PUBLICATIONS

Ginevra Castellano et al, Detecting user engagement with a robot companion using task and social interaction-based features, ACM New York, NY, USA © 2009, ICMI-MLMI '09 Proceedings of the 2009 international conference on Multimodal interfaces, pp. 119-126.*

(Continued)

*Primary Examiner* — Hadi Armouche
*Assistant Examiner* — Ali Shayanfar
(74) *Attorney, Agent, or Firm* — Sughrue Mion, PLLC

(57) ABSTRACT

Provided are a method and an apparatus for processing multimedia to provide a simulated experience where a plurality of remote users simultaneously view the same content even though one of the users is viewing the content at a different time. The method includes reading out information regarding user reactions to content during playback of the content, displaying a history of user reactions according to the information regarding the user reactions, and playing back a portion of content corresponding to a selected time point from the history of the user reactions at which the user reactions occurred.

21 Claims, 5 Drawing Sheets

(56) References Cited

U.S. PATENT DOCUMENTS

| | | | |
|---|---|---|---|
| 2007/0189719 A1* | 8/2007 | Furumachi et al. | 386/95 |
| 2008/0059158 A1* | 3/2008 | Matsuo et al. | 704/221 |
| 2008/0284615 A1* | 11/2008 | Tauchi et al. | 340/905 |
| 2009/0132593 A1* | 5/2009 | Lv | 707/104.1 |
| 2009/0165030 A1* | 6/2009 | Cronin | 725/14 |
| 2009/0280573 A1* | 11/2009 | Kawabata et al. | 436/177 |
| 2010/0167819 A1* | 7/2010 | Schell | 463/36 |
| 2014/0059577 A1 | 2/2014 | Seo | |

FOREIGN PATENT DOCUMENTS

| | | | |
|---|---|---|---|
| JP | 2005-63163 A | 3/2005 | |
| KR | 10-0828371 B1 | 5/2008 | |

OTHER PUBLICATIONS

Communication dated Jul. 18, 2014 issued by the Korean Intellectual Property Office in counterpart Korean Patent Application No. 10-2008-0059791.

Communication issued on Jan. 29, 2015 by the Korean Intellectual Property Office in related application No. 1020080059791.

Communication dated Jul. 27, 2015 issued by the Korean Intellectual Property Office in counterpart Korean Patent Application No. 10-2015-0042367.

* cited by examiner

METHOD AND APPARATUS FOR PROCESSING MULTIMEDIA

CROSS-REFERENCE TO RELATED PATENT APPLICATION

This application claims priority from Korean Patent Application No. 10-2008-0059791, filed on Jun. 24, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to processing multimedia, and more particularly, to processing multimedia to provide a simulated experience of a plurality of remote users simultaneously viewing the same content even though one of the users is presently viewing recorded content, by recording and reproducing previous reactions of users that have watched the same content.

2. Description of the Related Art

Online services or content playback devices providing multimedia content are becoming increasingly more popular.

In online services or content playback devices in the related art, video conferencing is used to obtain an experience that a plurality of users are simultaneously viewing the same content.

In other words, the reactions of other users viewing the content via video conferencing are displayed on screens to provide an experience that the users are simultaneously viewing the same content, in online services or content playback devices in the related art.

However, related art methods of viewing content simultaneously has inconveniences in that a plurality of remote users are required to playback content simultaneously while connected to each other via a network.

SUMMARY OF THE INVENTION

The present invention provides a method and an apparatus for processing multimedia to provide a simulated experience of a plurality of remote users simultaneously viewing the same content even though one of the users is presently viewing recorded content, by recording and reproducing previous reactions of users that watched the same content.

According to an aspect of the present invention, there is provided a multimedia processing method reproducing an experience of viewing content, the multimedia processing method including reading out information regarding user reactions to content during playback of the content; displaying a history of the user reactions according to the information regarding the user reactions; and playing back a particular portion of content corresponding to a selected time point from the history of the user reactions at which the user reactions occurred.

According to another aspect of the present invention, there is provided a multimedia processing method of reproducing an experience of viewing content, the multimedia processing method including reading out information regarding user reactions to content during playback of the content; displaying indicators at time intervals for which user reactions are detected according to the information regarding the user reactions; and displaying icons indicating the user reactions with the indicators.

According to another aspect of the present invention, there is provided a multimedia processing device including a user reaction input unit which inputs user reactions during playback of content; a display unit which displays the content in playback and a user's content reaction record; and a control unit which records a time point at which the user reactions occurred and the user reaction obtained from the user's reaction input via the user reaction input unit, displays a history of reactions on the display unit, and plays back a particular portion of the content which corresponds to a selected time point from the history of the user reactions at which the user reactions occurred.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will now be described with reference to the attached drawings.

Figure 1:
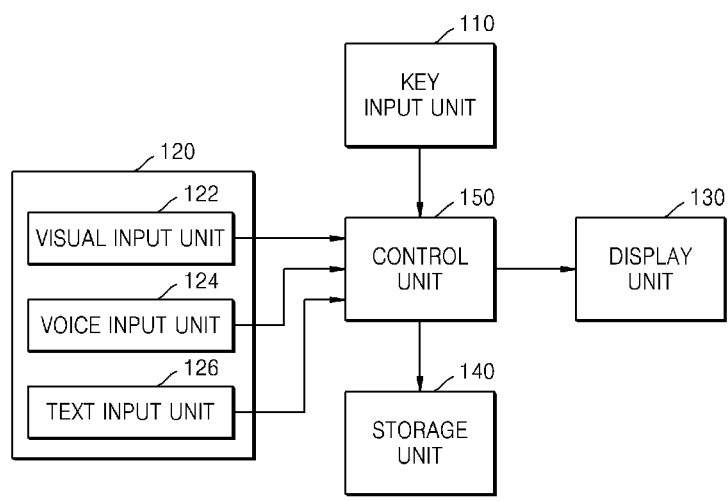
FIG. 1 is a block diagram of a multimedia processing device according to an exemplary embodiment of the present invention.

FIG. 1 is a block diagram of a multimedia processing device according to an embodiment of the present invention.

The multimedia processing device includes a key input unit 110, a user reaction input unit 120, a display unit 130, a storage unit 140, and a control unit 150.

The key input unit 110 includes a plurality of number/character input keys and function keys for interfacing with a user, such as keypads and a touch screen.

Specifically, the key input unit 110 selects content information and icons displayed in the display unit 130 by using predetermined keys.

The user reaction input unit 120 collects reactions of a user during playback of content. In other words, the user reaction input unit 120 may include a visual input unit 122, a voice input unit 124, and a text input unit 126. The visual input unit 122 captures visual information of the user viewing the content, and inputs the captured visual information to the control unit 150. The voice input unit 124 collects voice information of the user viewing the content via a microphone and inputs the collected voice information to the control unit 150. The text input unit 126 inputs text information of the user viewing the content to the control unit 150.

The display unit 130 is a unit, such as, but not limited to, a cathode-ray tube (CRT) or a liquid crystal display (LCD), that displays characters generated by the control unit 150 or video content stored in the storage unit 140. Specifically, the display unit 130 displays a history of reactions of a user based on the user's reaction record generated in the control unit 150.

The storage unit 140 includes, but is not limited to, a read-only memory (ROM) and a random access memory (RAM) to store various programs and data, and includes a voice memory. The storage unit 140 stores multimedia contents or a user's content reaction record generated in the control unit 150.

The control unit 150 records a user's reaction to content to the storage unit 140 by using visual, voice, and text information input by the user reaction input unit 120, detects reaction changes in the recorded user reaction, and records time points at which a reaction occurred and the reaction to the storage unit 140.

Furthermore, the control unit 150 reads out information regarding the reaction and time points, which are recorded separately from content, when the content is being played back, displays the history of reactions according to the read-out information regarding the reaction and time points, and plays back content corresponding to time points at which reaction of the user is changed whenever a time point at which reaction of the user is changed is selected from the history of reactions of the user.

Figure 2:
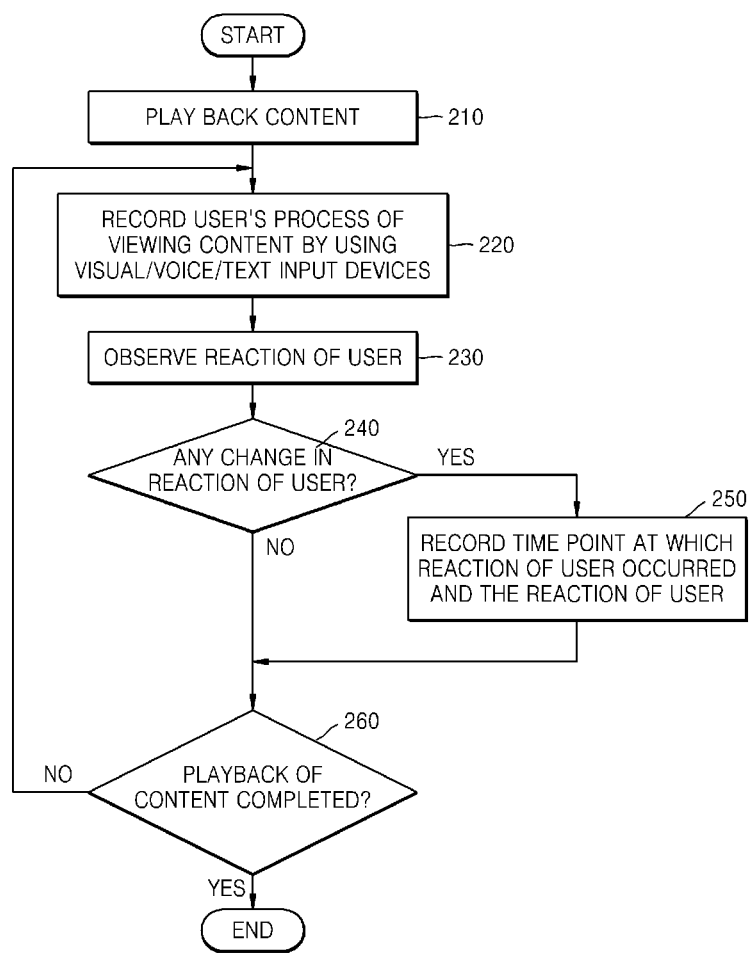
FIG. 2 is a flowchart showing a method of processing multimedia for recording an experience of viewing content, according to an exemplary embodiment of the present invention.

FIG. 2 is a flowchart showing a method of processing multimedia for recording an experience of a user viewing content according to an exemplary embodiment of the present invention.

First, playback of multimedia content selected by a user is started (operation 210).

Then, a reaction of the user is recorded by using visual, voice, and/or text input devices such as, but not limited to, a camera or a microphone during the playback of the content (operation 220).

Then, the reaction of the user, such as facial expressions, the voice of the user, and the heartbeat rate of the user, is observed (operation 230). There may be various technologies for detecting a reaction of a user. In an exemplary embodiment, a plurality of face templates regarding facial expressions such as, but not limited to, laughter, sadness, surprise, and disappointment are stored in the storage unit 140 in advance. Thus, the reaction can be determined by comparing face information of the user viewing content during playback of the content to the face templates stored in advance. According to other technologies for detecting a reaction of a user, the reaction may be detected based on brain waves or the heartbeat of the user.

Then, the detected change of reaction is categorized to facial expressions such as laughter, sadness, surprise, disappointment, etc., and a reaction change of the user can be automatically detected according to the categorized facial expressions.

Next, it is determined whether there is any change in the reaction of user (operation 240). When a reaction of the user is detected, the reaction and time points at which the reaction occurred are recorded (operation 250). In an exemplary embodiment, if a reaction of the user which corresponds to a surprised face is detected, then a time point at which the user reaction began, a time point at which the user reaction ended, an identification (ID) of the user, and user's reaction information are recorded with its corresponding content. Here, the user's reaction information may be indicated by visual, voice, text information, or the heartbeat.

Accordingly, a user's content reaction record including time points at which a reaction occurred and the user reaction are combined with its corresponding content. In other words, information regarding the time points at which the user reaction occurred and user's reaction information are generated as metadata, and the metadata are combined with its corresponding content.

Otherwise, if no user reaction is detected (operation 240), it is determined whether playback of content is completed (operation 260).

Thus, if the playback of content is completed (operation 260), then recording of the user's content reaction is terminated. Otherwise, if the playback of content is not completed (operation 260), the method returns to operation 220.

Figure 3:
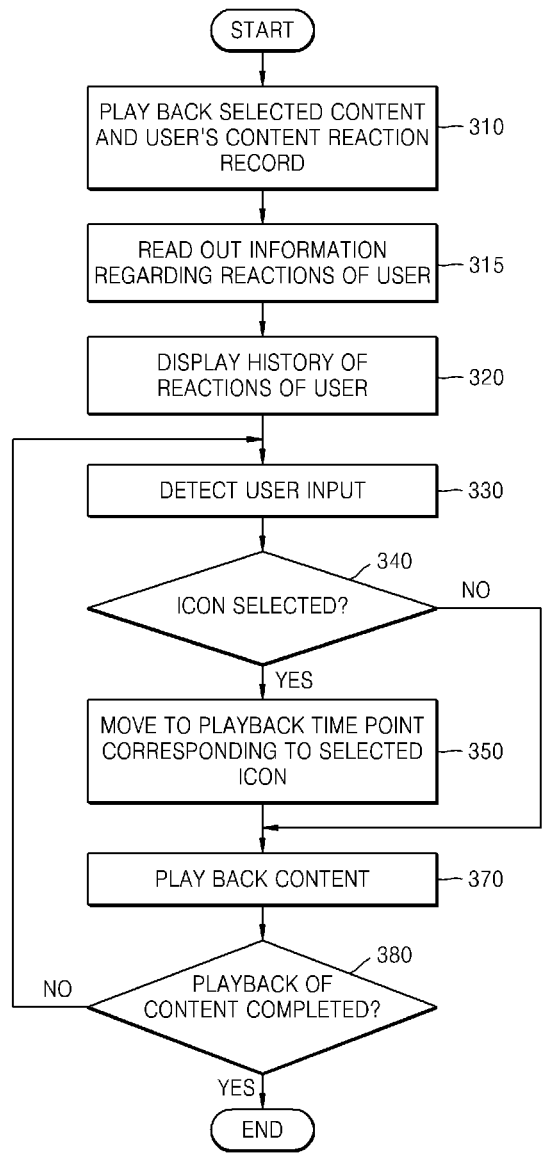
FIG. 3 is a flowchart showing a method of processing multimedia to simulate an experience of simultaneously viewing content, according to an exemplary embodiment of the present invention.

FIG. 3 is a flowchart showing a method of processing multimedia to simulate an experience of simultaneously viewing content, according to an exemplary embodiment of the present invention.

First, multimedia content selected by a user and a user's content reaction record which corresponds to the content are played back (operation 310). Here, the user's content reaction record is played back with the content. Also, the user's content reaction record includes a time point at which the reaction began, a time point at which the reaction ended, an ID of the user, and user's reaction information.

Then, referring to the user's content reaction record, which is metadata, recorded information regarding the user's reaction is read out (operation 315) while the multimedia content is being played back.

Then, a history of reactions is displayed, for example, on a playbar on screen according to the read-out user's content reaction record (operation 320).

In the exemplary embodiment, the history of reactions includes time points at which reactions occurred, an ID of the user, and user's reaction information throughout playback of the entire multimedia content.

Therefore, once the playback of multimedia content starts, an indicator indicating a time interval for which a reaction occurred is shown together with an indicator indicating a current playback time point on the playbar. Then, icons indicating IDs of the users and their corresponding facial expressions are shown with their corresponding time points at which the user reactions are detected.

Then, it is determined whether a user input is detected (operation 330).

Thus, if a user input is detected (operation 330), it is determined whether a particular icon shown on the playbar is selected (operation 340).

Then, if an icon is selected (operation 340), a current playback time point is shifted to a time point corresponding to the selected icon (operation 350), and content at the time point corresponding to the selected icon is played back (operation 370).

Otherwise, if no icon is selected (operation 340), the content is continuously played back (operation 370).

Then, it is determined whether the playback of content is completed (operation 380).

If the playback of content is completed (operation 380), playback of multimedia content is terminated. Otherwise, if the playback of content is not completed (operation 380), the method returns to operation 330.

In an exemplary embodiment of the present invention, a method of processing multimedia content including information regarding a user, can be browsed by various navigation algorithms such as sorting, skipping, etc.

For example, if a user wants to play back multimedia content corresponding to a particular reaction, information regarding the particular reaction is selected from a user's content reaction record. Then, only an icon indicating the particular reaction is displayed, and content corresponding to the displayed icon is selectively played back or skipped.

In another exemplary embodiment, a method of processing multimedia includes icons indicating the history of reactions are temporarily shown before and after time points at which reactions have occurred and are hidden after a certain amount of time.

Figure 4:
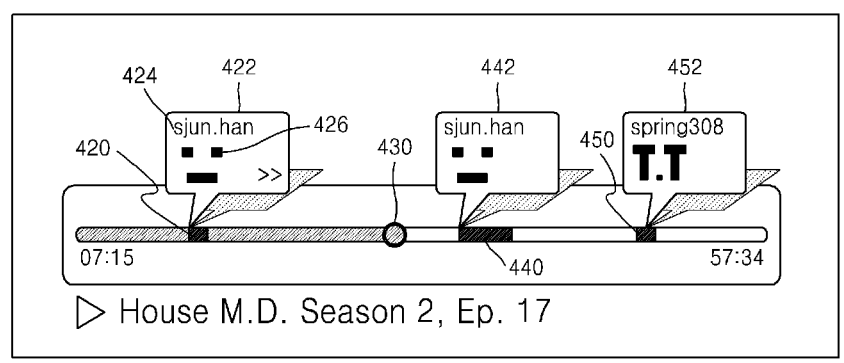
FIG. 4 is a diagram showing a playback bar indicating information regarding a user's experience of viewing content, according to an exemplary embodiment of the present invention.

FIG. 4 is a diagram showing a playback bar indicating information regarding a user's experience of viewing content, according to an exemplary embodiment of the present invention.

During playback of content, information regarding a user reaction who viewed the content, is read out by referring to metadata. In the exemplary embodiment, a history of reactions including time points at which reactions occurred and user's reaction information are shown on the playbar on screen.

When playback of content starts, an indicator 430 which indicates a current time point of playing back content and indicators 420, 440, and 450 which indicate time intervals for when reactions occurred, are shown on the playbar. Furthermore, icons 422, 442, and 452, which indicate reactions, are shown at the indicators 420, 440, and 450, respectively. The icon 422 indicates an ID and a reaction 426 of the user 424. In the exemplary embodiment, the reaction 426 refers to a facial expression such as laughter or disappointment.

For example, it is assumed that time intervals for which reactions occur during the time of playing back content, are from the 5:00 minute mark to the 6:00 minute mark, the 50:00 minute mark to the 55:00 minute mark, and the 1:10:00 mark to the 1:11:00 mark. Then, when content is played back, the icons 422, 442, and 452 which each indicate an ID of a user and an emotional status of the user, are shown at their respective indicators 420, 440, and 450 at time intervals for which reactions occurred. Thus, a user may select desired scenes or skip unwanted scenes according to information regarding a user's facial expressions shown on the icons 422, 442, and 452. In the exemplary embodiment, if the icon 422 is selected, a particular portion of recorded content and the corresponding reaction during a time interval between the 5:00 minute mark and the 6:00 minute mark may be watched.

Accordingly, a user of a multimedia device may selectively watch scenes where another user laughed when watching the same comedy program. Furthermore, the user can skip brutal and startling scenes in a horror movie by referring to records of the other user.

Figure 5:
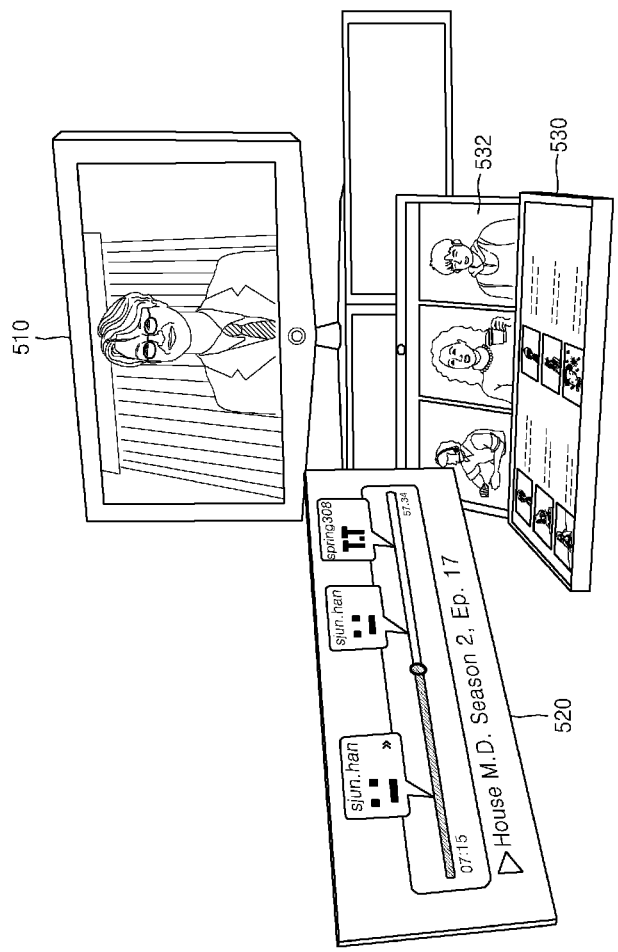
FIG. 5 is a diagram showing a content providing device simultaneously providing a user's content reaction record and its corresponding content, according to an exemplary embodiment of the present invention.

FIG. 5 is a diagram showing a content providing device 530 simultaneously providing a user's content reaction record and its corresponding content, according to an exemplary embodiment of the present invention.

Referring to FIG. 5, a first display device 510, a second display device 520, and a content processing device 530 are connected to each other via wire and wireless means.

When content is selected in the content processing device 530 by a user, the content is output to the first display device 510. Here, when playback of the content starts, the history of reactions is shown on the second display device 520 with icons. When the user selects one of the icons, a current time point of playing back content is shifted to a time point corresponding to the selected icon. Then, information regarding a reaction of a user 532 corresponding to the selected icon is shown as visual information on the content processing device 530. In the exemplary embodiment as shown in FIG. 5, if a time interval of content corresponding to a particular icon is between the 5:00 minute mark and the 6:00 minute mark, the content processing device 530 plays back the particular portion of content corresponding to the time interval between the 5:00 minute mark and the 6:00 minute mark.

Furthermore, the content and the history of reactions may be either shown separately on the first and second display devices 510 and 520, or shown together on a display unit included in the content processing device 530.

The invention may also be embodied as computer readable codes on a computer readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, and optical data storage devices. The computer readable recording medium may also be distributed over network coupled computer systems so that the computer readable code is stored and executed in a distributed fashion.

The invention may also be embodied as computer readable codes on a computer readable transmission medium. Examples of the computer readable transmission medium include carrier waves (such as data transmission through the Internet).

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A multimedia processing method for reproducing a content, the multimedia processing method comprising:
   detecting information regarding user reactions to the content during a reproduction of the content, the information comprising the user reactions and time intervals when the user reactions occurred;
   displaying, along a playbar, a history of the user reactions comprising indicators of the time intervals when the user reactions occurred and the user reactions that respectively occurred during the time intervals;
   determining whether the history of the user reactions displayed on the playbar is selected by a user; and
   reproducing a portion of the content corresponding to a time interval when a certain user reaction occurred, in response to the certain user reaction being selected from the history of the user reactions.

2. The multimedia processing method of claim 1, wherein the information regarding the user reactions is read out by referring to metadata connected to the content, during playback of the portion of the content.

3. The multimedia processing method of claim 1, wherein the information regarding the user reactions is played back with the portion of the content.

4. The multimedia processing method of claim 1, wherein the displaying the history of the user reactions comprises showing on the playbar icons indicating the user reactions in correspondence with the time intervals at which the user reactions are detected.

5. The multimedia processing method of claim 1, wherein the displaying the history of the user reactions comprises:
   displaying a current time point indicator indicating a current time point of reproducing the content on the playbar; and
   displaying icons indicating the user reactions, at the time intervals at which the user reactions are detected.

6. The multimedia processing method of claim 5, wherein each of the icons identifies the user and a corresponding user reaction.

7. The multimedia processing method of claim 1, wherein the displaying the history of the user reactions further comprises displaying an identification of a user and a corresponding user reaction onto the time interval at which the user reaction occurred.

8. The multimedia processing method of claim 7, wherein the user reactions are expressed by visual, text, or voice outputs.

9. The multimedia processing method of claim 7, wherein the user reactions are expressed by brain waves or heartbeat of the user.

10. The multimedia processing method of claim 1, wherein the history of reactions is temporarily shown before and after time points at which the reactions have occurred and is hidden after a predetermined time.

11. The multimedia processing method of claim 1, wherein the history of the user reactions is displayed in a region of a screen with the reproduction of the content.

12. The multimedia processing method of claim 1, wherein the content being reproduced and the history of the user reactions are shown together on a display device.

13. The multimedia processing method of claim 1, wherein the content being reproduced and the history of the user reactions are shown on separate display devices.

14. The multimedia processing method of claim 1, wherein the reproducing the portion of the content comprises:
selectively reproducing portions of the content corresponding to selected time intervals at which the user reactions occurred, and skipping unselected portions of the content.

15. The multimedia processing method of claim 1, wherein the displaying comprises:
displaying the playbar of the content on a screen; and
displaying each of the user reactions visually associated with a corresponding time interval of the content during which the user reaction occurred.

16. The multimedia processing method of claim 1, wherein the user reactions are visually represented by icons, and
each of respective icons is visually associated, on a screen, to a beginning of a corresponding time interval of the content.

17. The multimedia processing method of claim 16, wherein the reproducing comprises:
receiving a selection of one of the displayed icons of the certain user reaction, from the displayed history of the user reactions; and
reproducing the portion of the content corresponding to the beginning of the time interval of the content with which a selected icon is visually associated, for a period of time which corresponds to the time interval associated with the portion of the content corresponding to the selected icon.

18. A multimedia processing device comprising:
an input device which inputs user reactions to content during a reproduction of the content, the information comprising the user reactions and time intervals when the user reactions occurred;
a display which displays, along a playbar, a history of the user reactions comprising indicators of the time intervals when the user reactions occurred and the user reactions that respectively occurred during the time intervals; and
a controller configured to record the user reactions input via the input device and time intervals when the user reactions occurred as a history of the user reactions, control the display to display the history of the user reactions on the display by displaying, along a playbar, indicators of the time intervals when the user reactions occurred and the user reactions that respectively occurred during the time intervals, determine whether the history of the user reactions displayed on the playbar is selected by a user, and reproduce a portion of the content corresponding to a time interval when a certain user reaction occurred, in response to the certain user reaction being selected from the history of the user reactions.

19. The multimedia processing device of claim 18, wherein the input device comprises:
a visual input device which inputs visual information regarding the user viewing the content;
a voice input device which inputs voice information regarding the user viewing the content; and
a text input device which inputs text information regarding the user viewing the content.

20. The multimedia processing device of claim 18, further comprising a storage unit which stores content synchronized with the history of the user reactions.

21. A non-transitory computer readable recording medium having recorded thereon a computer program which, when executed by a computer, causes the computer to execute a multimedia processing method for reproducing a content, the method comprising:
detecting information regarding user reactions to the content during a reproduction of the content, the information comprising the user reactions and time intervals when the user reactions occurred;
displaying, along a playbar, a history of the user reactions comprising indicators of the time intervals when the user reactions occurred and the user reactions that respectively occurred during the time intervals;
determining whether the history of the user reactions displayed on the playbar is selected by a user; and
reproducing a portion of the content corresponding to a time interval when a certain user reaction occurred, in response to the certain user reaction being selected from the history of the user reactions.

* * * * *